United States Patent
Picard et al.

(10) Patent No.: US 10,642,629 B2
(45) Date of Patent: May 5, 2020

(54) WEB-APPLICATION-LAUNCH APPLICATION PROGRAMMING INTERFACES

(71) Applicant: HEWLETT PACKARD ENTERPRISE DEVELOPMENT LP, Houston, TX (US)

(72) Inventors: Jean-Charles Picard, Mougins (FR); Jean Michel Dias Vaz, Mougins (FR)

(73) Assignee: Hewlett Packard Enterprise Development LP, Houston, TX (US)

(*) Notice: Subject to any disclaimer, the term of this patent is extended or adjusted under 35 U.S.C. 154(b) by 170 days.

(21) Appl. No.: 15/748,924

(22) PCT Filed: Sep. 30, 2015

(86) PCT No.: PCT/US2015/053192
§ 371 (c)(1),
(2) Date: Jan. 30, 2018

(87) PCT Pub. No.: WO2017/019111
PCT Pub. Date: Feb. 2, 2017

(65) Prior Publication Data
US 2019/0012187 A1    Jan. 10, 2019

(30) Foreign Application Priority Data
Jul. 30, 2015  (EP) .................................... 15306239

(51) Int. Cl.
*G06F 9/445* (2018.01)
*G06F 16/958* (2019.01)
*H04L 29/08* (2006.01)

(52) U.S. Cl.
CPC ...... *G06F 9/44505* (2013.01); *G06F 9/44526* (2013.01); *G06F 16/958* (2019.01); *H04L 67/02* (2013.01)

(58) Field of Classification Search
CPC .............. G06F 16/958; G06F 9/44505; G06F 9/44526; G06F 9/445
See application file for complete search history.

(56) References Cited

U.S. PATENT DOCUMENTS

| 6,826,696 B1 | 11/2004 | Chawla et al. |
| 8,788,946 B2 | 7/2014 | Hegde et al. |

(Continued)

FOREIGN PATENT DOCUMENTS

| WO | WO-2015094359 A1 | 6/2015 |
| WO | WO-2015147894 A1 | 10/2015 |

OTHER PUBLICATIONS

Cisco Systems, Inc., "Cisco Agent Desktop: Methods for Integrating Third-Party Enterprise Applications," Tech Note, Jul. 6, 2006, pp. 1-12.

(Continued)

*Primary Examiner* — Chirag R Patel
(74) *Attorney, Agent, or Firm* — ZBM Patents, S.L.

(57) ABSTRACT

A web-application-launch application programming interface (API) component is disclosed for integration to a web application executable at a client. The web-application-launch API component comprises a launch services module to manage execution of a launch of a web application external to the web application. Execution of the launch of the external web application is called by a component of the web application. The web-application-launch API component further comprises an API specifying a launch-definition format applicable to a launch to be executed by a launch services module. A launch definition according to the specified launch-definition format includes a launch argument comprising a list of keywords. The launch services module comprises a keyword-resolution module. The keyword-resolution module of the launch services module is responsive to a call for execution of a launch to resolve, dynamically, the (Continued)

keywords of the launch argument in the launch definition of the called launch. The launch services module comprises an execution portion to implement execution of a called launch. The launch is executed at the client in accordance with the keywords in the launch argument of the called launch as resolved by the keyword-resolution module when execution of the launch is called.

15 Claims, 10 Drawing Sheets

(56) References Cited

U.S. PATENT DOCUMENTS

| | | | |
|---|---|---|---|
| 8,793,650 | B2 | 7/2014 | Hilerio et al. |
| 8,935,314 | B2 | 1/2015 | Ravichandran et al. |
| 2006/0069671 | A1 | 3/2006 | Conley et al. |
| 2010/0023953 | A1 | 1/2010 | Lee et al. |
| 2010/0235762 | A1 | 9/2010 | Laiho et al. |
| 2010/0333117 | A1 | 12/2010 | Culbreth et al. |
| 2011/0314389 | A1* | 12/2011 | Meredith ............... G06F 8/60 715/751 |
| 2012/0179706 | A1 | 7/2012 | Hobbs et al. |
| 2013/0124608 | A1 | 5/2013 | Gregorio et al. |
| 2013/0218954 | A1 | 8/2013 | Kaegi et al. |
| 2014/0250106 | A1* | 9/2014 | Shapira ............... G06F 3/04842 707/722 |
| 2015/0058869 | A1 | 2/2015 | Mandic et al. |

OTHER PUBLICATIONS

Extended European Search Report, EP Application No, 15306239.3, dated Feb. 3, 2016, pp. 1-8, EPO.

Georgia M. Kapitsaki et al., "Model-Driven Development of Composite Context-Aware Web Appiications," Information and Software Technology, Aug. 1, 2009, pp. 1244-1260, Elsevier B.V.

International Search Report and Written Opinion, International Application No, PCT/US2015/053192, dated Apr. 22, 2016, pp. 1-8, KIPO.

Stefano Ceri et al., "Model-Driven Development of Context-Aware Web Applications," ACM Transactions on Internet Technology (TOIT), Jan. 2007, pp. 1-32, vol. 7, No. 1, ACM.

* cited by examiner

WEB-APPLICATION-LAUNCH APPLICATION PROGRAMMING INTERFACES

BACKGROUND

The present disclosure relates to application programming interfaces (APIs).

Application programming interfaces (APIs) are sets of routines, protocols, and tools for building software applications. APIs specify how software components should interact with each other, typically to achieve performance of some task. An API may be likened to a kind of coding contract that specifies, for instance, how a computer program should access a database, control a peripheral device, and so on. For example, if a programmer wishes to write a set of machine-readable instructions for a processor to enable the processor to read and analyse data from Twitter® then he may base the instructions on the Twitter API.

APIs can be made up of different elements depending on the components that are interacting, and the type of interaction. For example, APIs may include libraries that specify the variables, classes of objects, methods, routines, data structures, functions, command formats, and so on, that may be involved in the interactions between the components.

DETAILED DESCRIPTION

Figure 1:
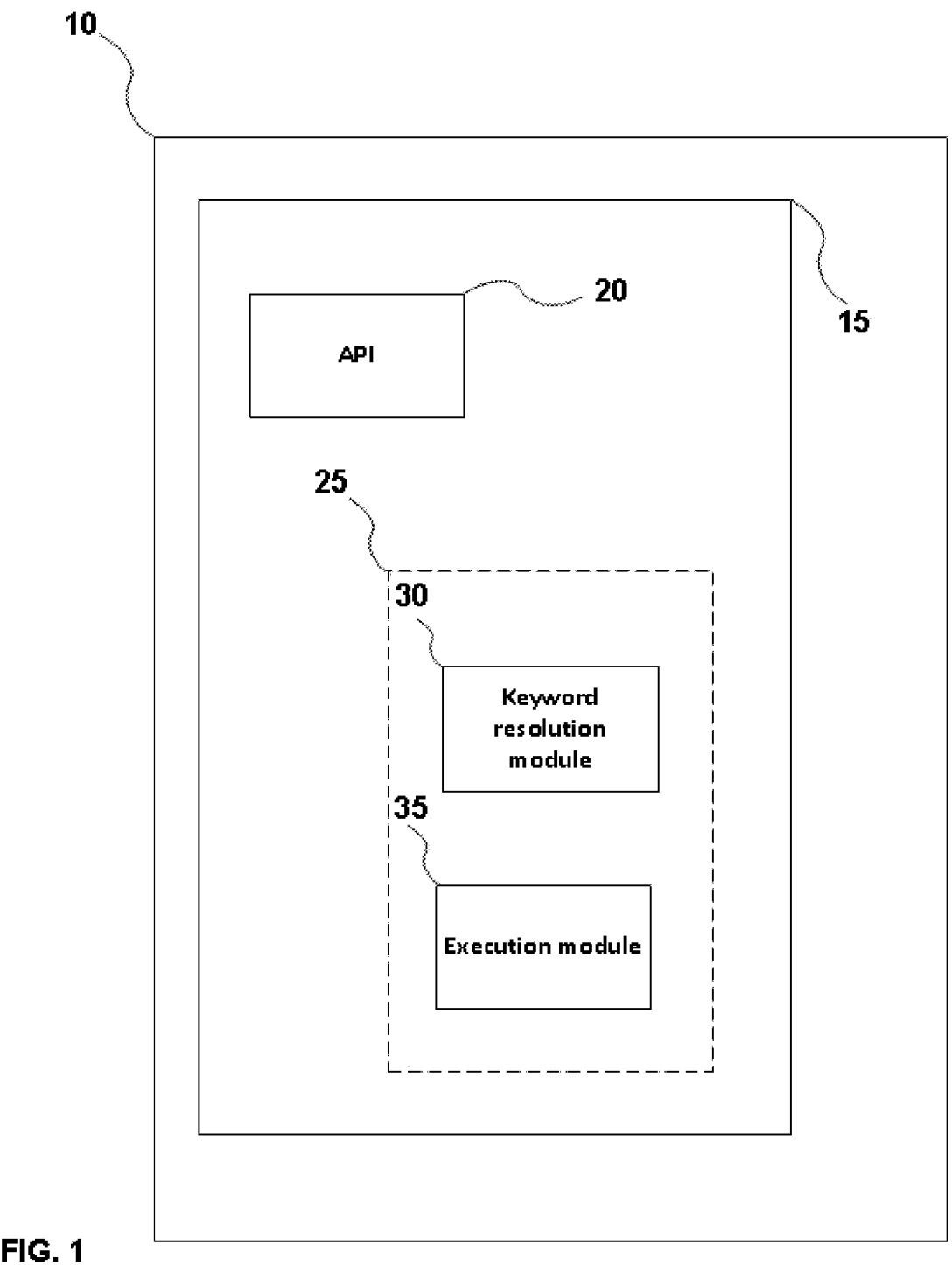
FIG. 1 is a diagram schematically representing a web-application-launch application programming interface (API) component for integration to a web application according to an example.

Examples of certain application programming interfaces (APIs) will be described below in the context of launching web applications (web services) using client-side web APIs. A client-side web API is a programming interface to extend functionality within a web browser or other HTTP client.

It is common for web applications to include the capability to execute the launch of one or more external web applications (i.e. web applications that are external to the application calling execution of the launch). For example, a host web application may have a user interface which allows a user to request a map showing the location of a place mentioned in the host web application. Typically, the host web application will respond to the user request by launching an external web application which then provides the host web application with some service (e.g. in the preceding example the external web application provides the host application with a map image to be displayed to the user).

In general, it is complicated and time-consuming for a designer to provide a web application with the capability to launch external web applications, especially if it is desired to make different launches possible. The designer may, for example, wish to make it possible to launch several different external web applications from within the host web application, and perhaps he may wish to have a different selection of launches made possible at one location within the host application compared with the selection that is available at a different location.

In a similar way, the designer may wish the selection of available launches and/or the characteristics of a launch to be different depending on some feature of the context in which a launch is executed. For example, the designer may wish the available selection of launches, and/or the characteristics of a launch, to be different for different users of the host application or, for instance, in dependence on the properties of the platform (personal computer, mobile telephone, tablet, etc.) on which the user is executing the host application, or on other features of the context including but not limited to an identifier of a selected object, a date or date range (for instance to scope the context to a specific range in order to produce, for example, a monthly report). Furthermore, the developer may wish the selection of available launches to depend on some user preference or other option. The launches available to a user of the host application in different circumstances may be said to be "visible" in those circumstances.

In general, when a designer provides his web application with the capability to launch external web applications each launch is defined in a static manner. More particularly, each launch tends to be hardcoded, that is, it is specified explicitly by machine instructions which are pre-programmed into the host web application. If the hard-coded launch has some conditional aspect that is related to the context in which the launch takes place then the necessary procedure for adding contextual parameters tends to be pre-defined (hardcoded).

In these circumstances the designer must spend considerable amounts of time and effort to provide his web application with the capability to launch each and every one of the potential external web applications. The necessary integration work can take a long time and tends to provide very static user interfaces for the end user. Furthermore, it is difficult to add additional launch capabilities (either in terms of adding the ability to launch additional external web applications or in terms of enabling launches to be adapted to additional contextual parameters). In other words the launch capabilities are not readily extensible. Furthermore, it can be difficult or impossible to provide fine-grained control of the visibility of launches in different contexts.

Launches according to the present disclosure are external applications that can be run from the host web application. They may be (Uniform Resource Locators) URLs or other custom pieces of code hereafter defined as "code modules" that may be executed from a main menu, a widget's toolbar or from a specific action inside a widget. The URLs or code modules may contain variables or "launch keywords", allowing the use of dynamic contextual parameters. Typically, any external system accessible through a URL that an administrator may want to expose to an end user may be defined as a launch. Examples of launches are PDF reports, online geographic maps (Google Maps, OpenStreetMap, or the like), incident management systems, etc. They may be useful for integration purposes.

All launches may be associated with launch definitions. A launch definition may have the following properties: (i) a unique identifier, (ii) a presentation name, (iii) an optional description, (iv) a version, (v) an author, (vi) a URL or a code module identifier, (vii) a launch mode: internal or external, (viii) an icon to represent visually the launch in menus and toolbars, (ix) roles to apply a role based security on the launch (role based security), (x) a category to associate this launch with a logical group, (xi) a state to indicate if the launch definition is active and ready to be used (or still under construction), (xii) tags to organize the launch lookup.

When executing a URL launch, the URL may integrate launch keywords to be solved at runtime. This may allow the launches to be dynamic and not hardcoded. When executing a code module launch, the Code Module identifier (controller) may be used and the list of keywords that have to be solved at runtime are passed as parameters. The values of the launch keywords may be retrieved from the context of the application. Depending on the page a user is viewing, the values may change. More precisely, the Code Module identifier may allow the retrieval of the corresponding runtime instance of the module. Then, this instance, which may be seen as a controller, may execute some code with a list of resolved keywords as parameters. The list of keywords to resolve may come from the launch definition of the code module.

To improve the organization of launches and to allow searching them more easily, a launch may be associated with a launch category. It may qualify the purpose of the launch and may allow distributing of the work related to the launch design and maintenance. Launch Categories may not have any functional impact but when launches are displayed the categories of the launch (presentation topic) may be visually seen. However, in some examples the display of the launch categories may be optional.

The launch keywords may be defined in two parts. The first part may represent the keyword's category or group and the second the keyword's name. The first part may be a logical group for the launch keyword, the second may be its name. Example keywords are the following:

- <CUSTOMER:CUSTOMER_ID>
- <PLATFORM:SERVER>
- <PLATFORM:PORT>
- <DATE:START_DATE>
- <USER:USER_ID>

Examples according to the present disclosure provide a web-application-launch application programming interface (API) component to plug in to a host web application to provide the host application with the capability to launch external web applications. The web-application-launch application programming interface (API) component may act as a launch engine on the client side and may execute custom code as launch processing. That is, the launch mechanism may be considered as a framework for handling launches. The web-application-launch API component according to these examples may be said to be "generic" because it may be easily integrated into a web application as its conventions may set few constraints for the developer. It may facilitate launch of substantially any external web application by the host application. Furthermore, it uses an open launch mechanism since it is possible to implement processing with code modules, generate customary launch keywords and launch tags. The web-application-launch API component may be integrated to any part of a web application, e.g. in the form of interaction elements in the graphical user interface of the host web application such as widgets.

Certain examples according to the present disclosure provide a web-application-launch API component that comprises a launch services module to manage execution of launches, of external web applications, whose execution may be commanded by components of the host application. An API of the web-application-launch API component may specify a format for a launch argument that may be a URL template or a code module and launch keywords' parameters included in the launch definitions. On receipt of a launch-execution command, the launch services module may implement a launch-parameter resolution process to resolve launch parameters that are specified in the launch argument for the relevant launch. The launch parameters may resolve dynamically when the command for executing a launch is issued, making it possible to associate relevant context to the launch just before the launch executes, and so static launches may be avoided.

Web-application-launch API components according to the above-mentioned examples are generic and are easy to integrate in a host web application by a developer/integrator, and provide an open and extensible framework in which new launches may be defined. This web-application-launch API component may be considered to be a kind of toolkit which the developer integrates into his host application and which operates, in effect, "behind the scenes"; the developer may control the presentation, for example the occasions when, and manner in which, a user is presented with available launches (e.g. via icons, menu lists and so on displayed in a graphical user interface (GUI)).

There is no particular limitation on the manner in which a host application may be associated with the user's work station and, furthermore, the host application may be installed on a hard drive of the work station, provided on a medium readable by the work station, accessed by the work station over a network, distributed over plural elements of the previous kinds, and so on.

Furthermore, there is no particular limitation on the manner in which the functional modules of the host application, represented in the various figures described below, are implemented in practice. The functional modules are illustrated as hardware components but additionally or alternatively they may be implemented in software or firmware, that is, using machine readable instructions executed by a processor. It will be understood that although various functional modules (processing modules, memory modules, and so on) that are liable to be present in a host application are omitted, the focus is on certain modules that are relevant to understanding of the present example. Moreover, it will be understood that the present example is not limited by reference to the distribution of functions between the modules represented; the functions may be distributed differently depending on the implementation and, for example, plural functions may be performed by a single module and plural modules may cooperate to achieve performance of a single function.

FIG. 1 is a diagram schematically representing a web-application-launch API component for integration to a web application according to an example. Web application 10 may host an integrated web-application-launch API component 15. The API component 15 may comprise an API 20 specifying a launch-definition format applicable to a launch of a web application external to the host web application. A launch definition according to the specified launch-definition format may include a launch argument comprising a list of keywords. The API component 15 may further comprise a launch services module 25 to manage internally or externally execution of a launch of an external web application. The launch services module 25 may comprise a keyword-resolution module 30 and an execution module 35. The keyword-resolution module 30, responsive to a call for execution of a launch, may resolve the keywords of the launch argument in the launch definition of the called launch dynamically. The execution module 35 may implement execution of a called launch. The execution may be performed in accordance with the launch keywords in the launch argument of the called launch as resolved by the keyword-resolution module 30 when execution of the launch is called. The launch parameters may, thus, be resolved dynamically at the web browser (client side) when the command for executing a launch is issued, making it possible to associate relevant context to the launch just before the launch executes, and so static launches may be avoided.

At various times the host application offers the user the opportunity to select an external web application for launching. A GUI management module of the host application may generate icons, links, menu list items, and so on, corresponding to the different launches that are available to the user and these may be displayed as part of the GUI. The host application may have a retrieval module which may obtain a list of the available launches, the list being provided by the web-application-launch API component.

When the user interacts with the GUI to select a launch, the host application may communicate with the launch services web-application-launch API component to command execution of the identified launch. The API of the web-application-launch API component may specify a format for launch definitions and this format may include a launch argument. When the web-application-launch API component receives a launch-execution command it may resolve launch parameters (keywords) contained in the launch argument included in the definition of the desired launch, using a resolution process. In some examples the launch definitions may be stored in a launch database, but any convenient support providing the launch definitions may be used (e.g. web services, CSV file, XML, and so on).

Web-application-launch API components according to the above-mentioned examples may be generic and easy to integrate into code, such as java. They may be easy to integrate with client side javascript technologies such as AngularJS, Backbone.JS or the like. They may be displayed in the form of widgets and may be integrated into a host web application by a developer/integrator with only a small amount of integration work, and provide an open and extensible framework in which new launches may be defined. This web-application-launch API component may be considered to be a kind of toolkit which a developer may integrate into the host application and which may operate, in effect, "behind the scenes"; the developer controls the presentation, for example the occasions when, and manner in which, a user is presented with available launches (e.g. via icons, menu lists and so on displayed in a graphical user interface (GUI)).

In examples according to this disclosure, when the launch is a URL launch, either an external or internal URL launch, the following actions may be performed:

A widget may be displayed and retrieve a list of available launches based on the role of the user, and a tag list that may act as a filter in the launch definitions. The list may be visible in a widget toolbar or become available following an event in the widget itself. The event may be a click, a button pressing or the like. When a user executes a launch, the widget may use a launch service in the launch services module to execute the launch and parse the URL to solve dynamically any launch keywords (e.g. <CUSTOMER:CUSTOMER_ID>, etc.). The service may browse any global launch keywords to solve them first. These keywords may be part of the library and may not require a specific context. Example of such keywords may be a server's name or port (<PLATFORM:SERVER>, <PLATFORM:PORT>, etc.) that may not depend on a widget context. Then the service may try to solve any keywords defined for the specific widget only. Example keywords may be a customer id or a start day (<CUSTOMER:CUSTOMER_ID>, <DATE:START_DATE>, etc.). The widget implementation may describe the list of available public keywords and provide the code to use to solve such keyword by, e.g. extracting data from request or internal memory. After these two resolution actions, the URL may be considered complete. The service may check the launch definition to see if the launch mode is e.g. external or internal and execute the URL in a new window or update an internal widget, such as an iframe widget. Then, the URL may be displayed internally or externally.

As the resolution is done on the client (web browser side), it may extend the 'controller' part beyond URL launches to code module launches and it may facilitate data retrieval. That is, instead of using always a URL, it is possible to incorporate pieces of code that may act as controllers to e.g. call other services, popping dialogs, etc., and to drive other widgets using a widget inter-communication service.

For example with an internal code module launch, each widget may be displayed, and its list of available launches may be retrieved based on the role of the user and a tag list that may act as a filter in the launch definitions. The list may again be visible in the widget toolbar or be available following an event in the widget itself. When a user executes a launch, the widget may use a common services to execute the launch. This service may get the complete launch definition (e.g. a controller identifier and a list of keywords needed as parameters and solve dynamically all the launch keywords (e.g.: <CUSTOMER:CUSTOMER_ID>, etc.). The service may browse all the global launch keywords to solve those first as discussed previously with the URL launch example. Then, similarly, the service may try to solve all the keywords defined for the widget only (e.g. <CUSTOMER:CUSTOMER_ID>, <DATE:START_DATE>, etc.) After these two resolution actions, the list of launch keywords may be considered solved and may be passed to the code module. Like all add-ons, the code module may be loaded dynamically to the Web browser after login, and then may become available anytime when the user needs to execute such a code module launch. The code module may be called with the solved parameters. The code module may be identified using a unique identifier (e.g.: myLaunchControllerAudit with keyword names <USER_ID>, <OPERATION_ID>, <DATE_NOW>). The code module launch may then be executed and the action done by, e.g., JavaScript code.

Examples of Code Module launches may include formatting data and changing a format expected in a URL, calling other services, perform or refresh requests, consolidate information, and then update accordingly other widgets, logging an operation to an external system and then calling a URL, parsing and creating by naming convention new identifiers used to update a specific widget and then forcing a refresh of data, and so on. The scope of action may be wide and limited only by the common services available at the client side.

Figure 2:
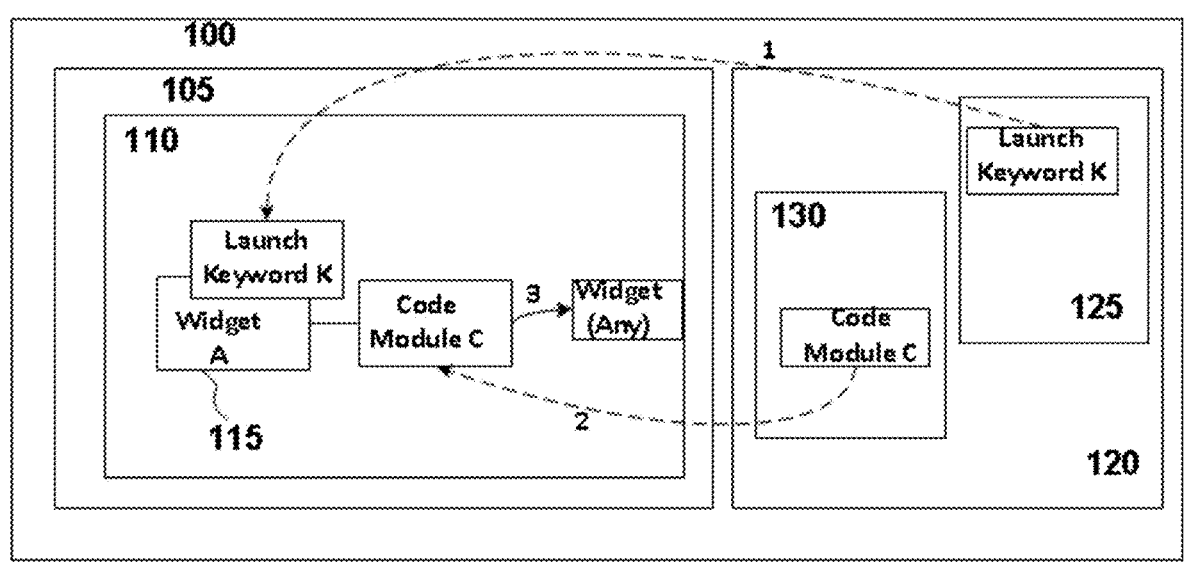
FIG. 2 is a diagram schematically representing an example of an internal launch mechanism.

FIG. 2 is a diagram schematically representing an example of an internal launch mechanism. Web application 100 may be a web browser and may host a workspace 105 with a view area 110. View area 110 may host API components such as API component 115 (Widget A). The user may select the widget A to execute an internal launch. Execution of the launch may require resolution of a keyword, e.g. Keyword E. Add-ons library 120 may comprise a list 125 of launch keywords and a list 130 of code modules. Launch keywords may be organized in groups to facilitate the search of all the launch keywords available in the add-ons library. In action 1, the launch keyword K may be solved. Alternatively, the widget A may comprise all the information it requires and just expose data it already has. It is noted that the widget A may be required to solve a number of launch keywords before calling the execution module to execute the launch. When all keywords are solved, the widget A may call the code module C in action 2. The widget A may then pass the parameters acquired by the solved launch keywords to the code module C. The code module C may then execute the launch, acting as a controller, by performing any desired action (e.g. action 3) to any component (any widget) using an internal API.

Figure 3:
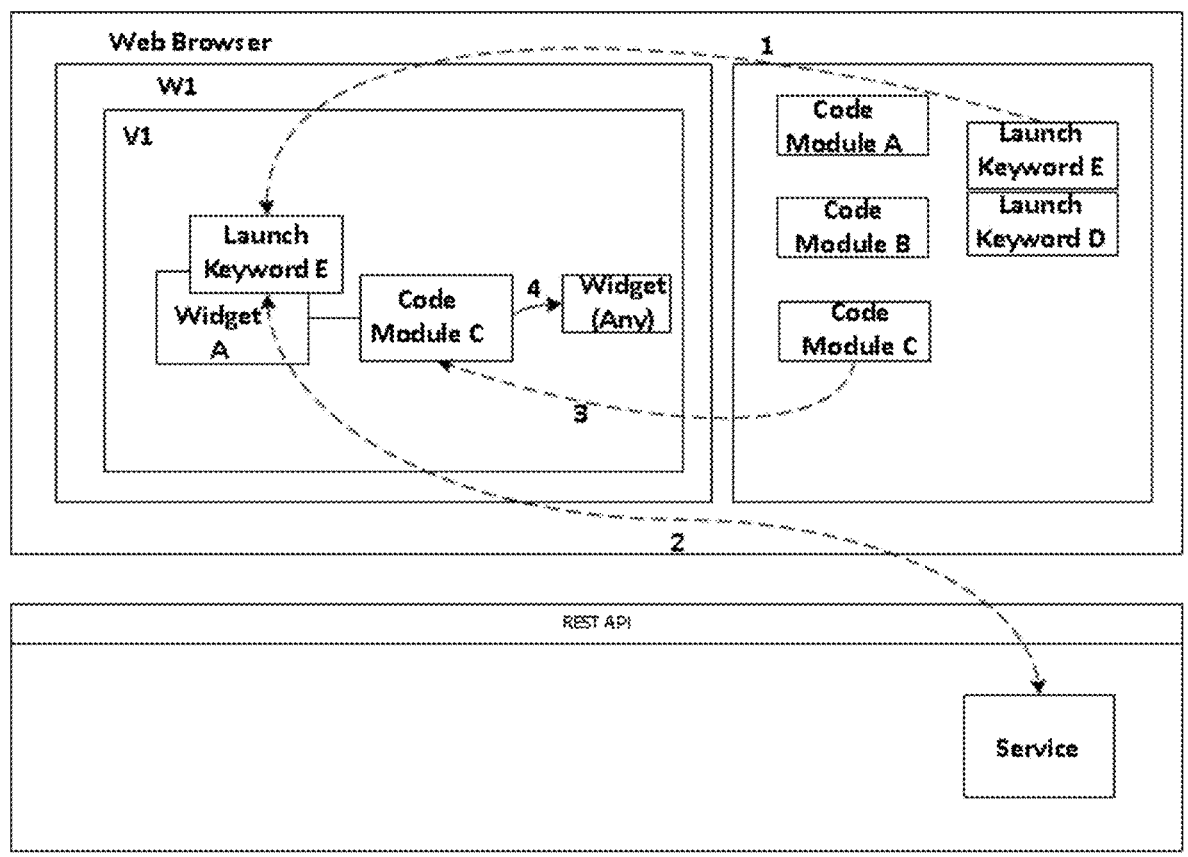
FIG. 3 is a diagram schematically representing an example of an internal launch mechanism calling a service on an external server.

FIG. 3 is a diagram schematically representing an example of an internal launch mechanism calling a service on an external server. In this scenario, the widget A may solve launch keyword E in action 1 and may be required to call a service on a server in action 2 using a server API (REST API). Then, when all launch keywords are solved, either internally or by calling external services, the code module C may be called and all parameters acquired by internal or external resolutions may then be passed to the code module C. The view V1 may belong to a workspace W1, e.g. the same tab, of the web browser.

Figure 4:
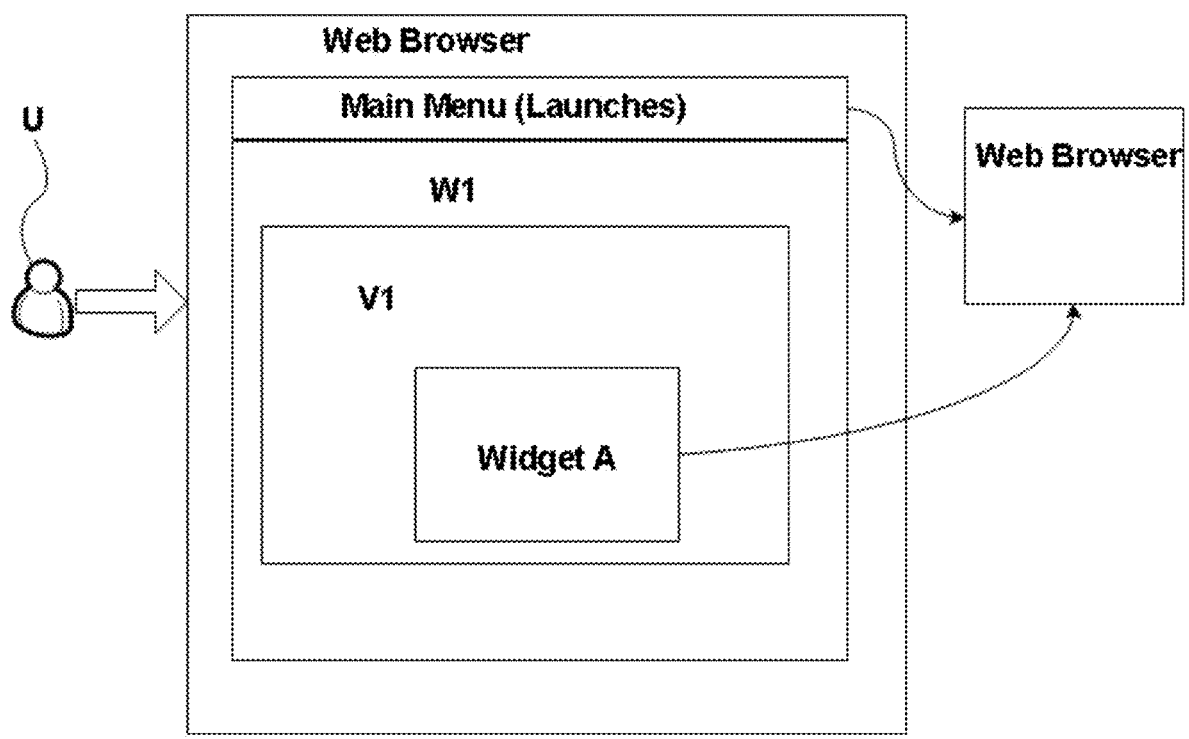
FIG. 4 is a diagram schematically representing an example of an externally executed URL launch.

There are two launch modes available for launches, external launch mode and internal launch mode. In an external launch mode the execution of a URL may be done in a pop-up window or a new tab in the web browser. FIG. 4 is a diagram schematically representing an example of an externally executed URL launch by user U. As the launch is executed in an external web browser page, the external launch mode may only be performed for URL launches.

Figure 5A:
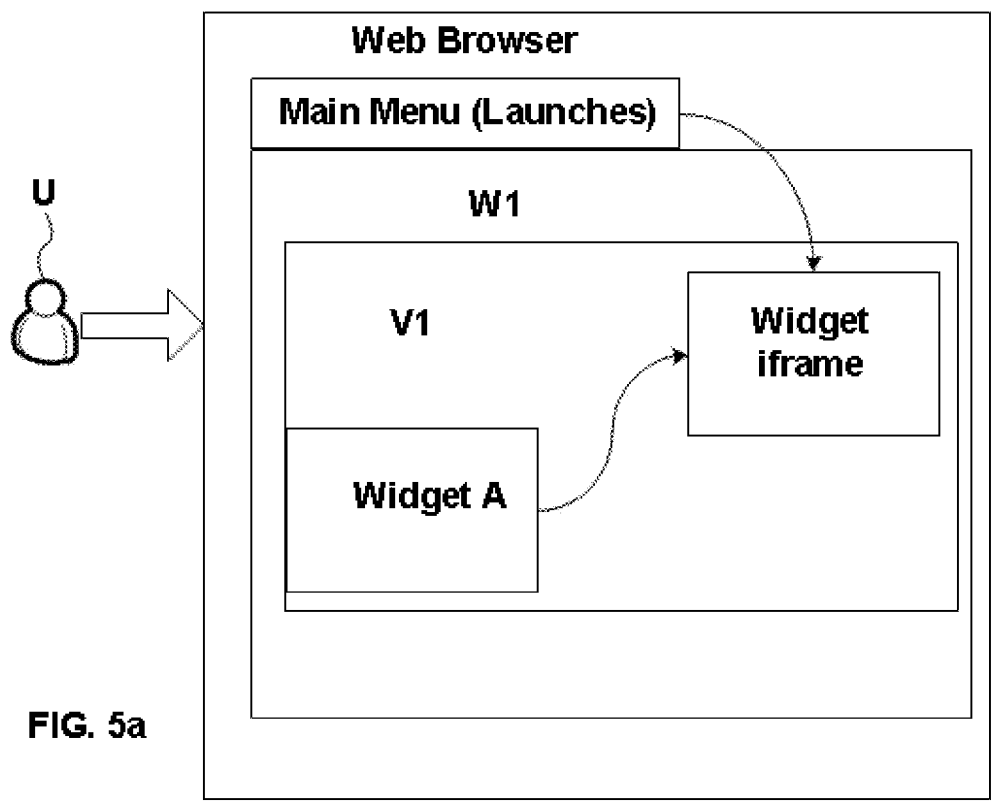
FIG. 5a is a diagram schematically representing an example of an internally executed URL launch.
Figure 5B:
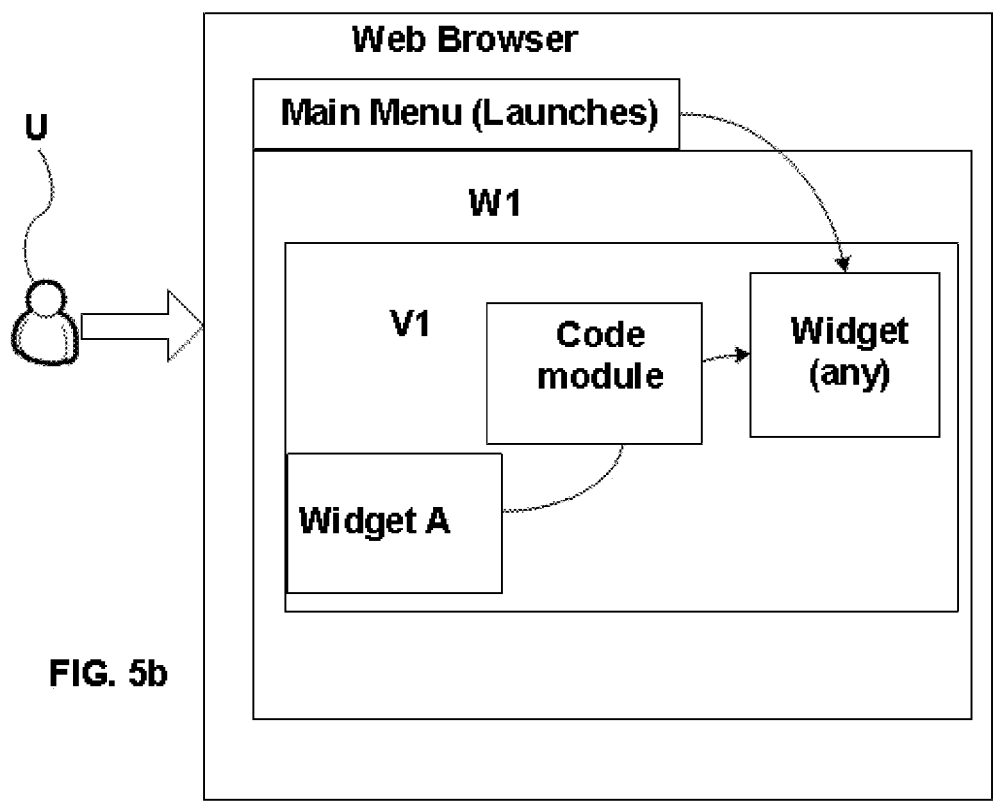
FIG. 5b is a diagram schematically representing an example of an internal launch mode of a code module launch.

There are two types of internal mode launches, the URL launch and the code module launch. FIG. 5a is a diagram schematically representing an example of an internally executed URL launch by user U. In case of an internally executed URL launch, the result may be viewed in a specific widget (Widget iframe) that may be part of the same view V1 as the widget implementing the launch (Widget A).

Figure schematically represents an example of an internal launch mode of a code module launch by user U. The code may be executed with the parameters (context) acquired after a launch keyword resolution and the code module may act as a controller to call another public API to drive another widget (e.g. Widget (Any)), request a service and also provide the result in the same view V1.

An example of a code module launch definition of a refresh action may be the following:

```
{
  "Id": "refresh-my-widget",
  "name": "RefreshMyWidget",
  "description": "Code module launch example",
  "version": "1.0",
  "author": "hp",
  "module": { "Id": "code-module-launch-sample1", "keywords":
[ "<SERVER>", "<PORT>", "<SUBSCRIBER_ID>",
"<DATE_NOW>"] } ,
  "mode": "internal",
  "icon": "map-marker",
  "tags": ["Demo"],
  "roles": ["Operator_L1"],
  "category": "geographical",
  "state": "ACTIVE"
}
```

In certain examples, the launch services module may use a tag-based approach for labelling launches. This may provide a simple and readily extensible mechanism for controlling, in a fine-grained manner, which launches are available in specified contexts or areas of the user interface (e.g. toolbar, menu, and so on). This tag mechanism may allow the developer to organize the category and scope of the launch applications. Moreover, this approach simplifies the process of searching for the launches that are available at any given time/location in the host application.

Figure 6:
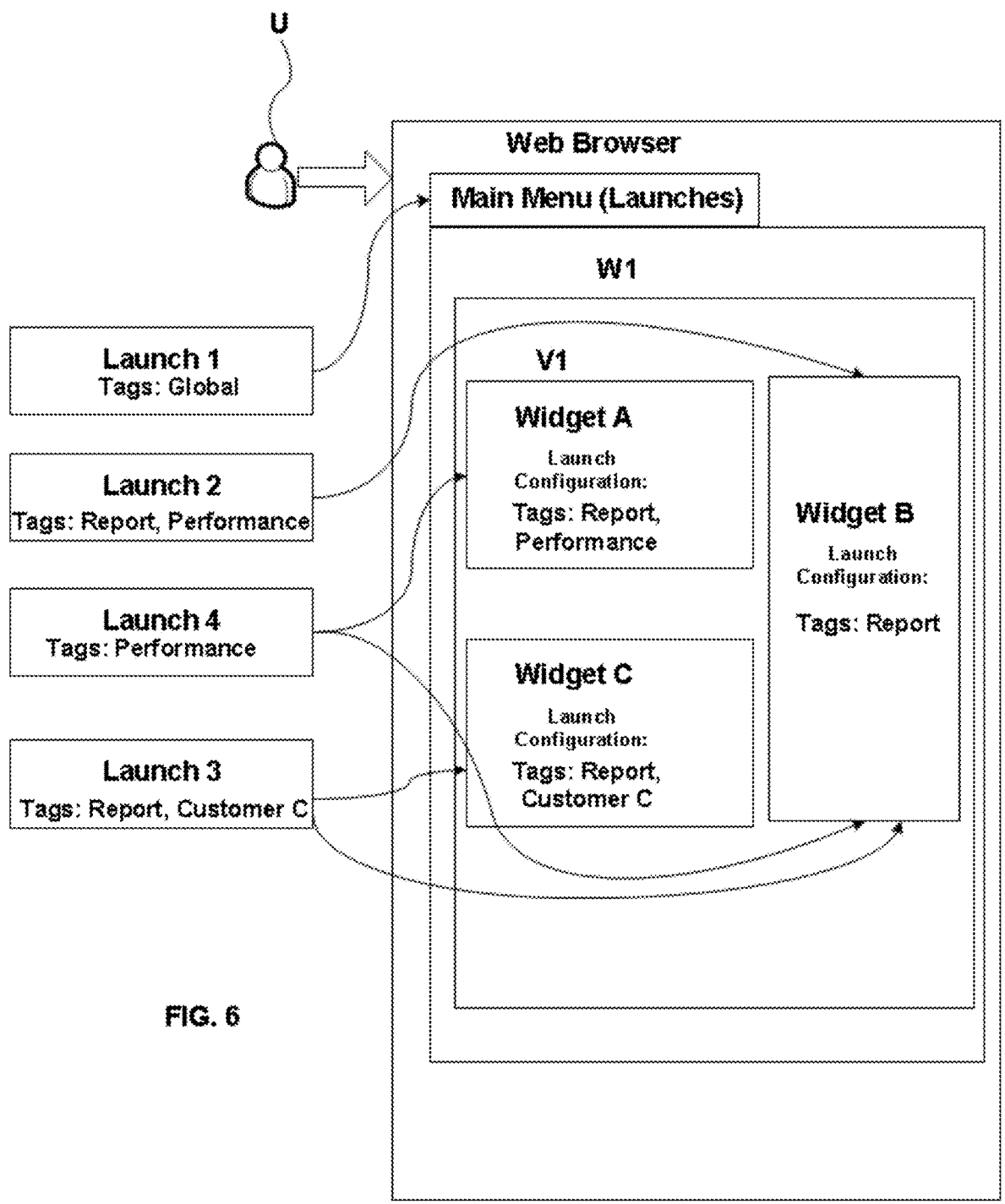
FIG. 6 is a diagram schematically representing an example of a launch mechanism using launch tags.

Launch tags may allow association of a launch with a specific area, workspace, view, a widget or a specific place inside a widget. They may be a free list of text definitions that allows a view designer or platform administrator to set launches available on a specific area of a workspace. A tag may define a semantic and create an association. The view designer may design views and configure on each widget the list of available tags to use to select the right set of launches to be exposed. FIG. 6 is a diagram schematically representing an example of a launch mechanism using launch tags. In FIG. 6, Widget A may filter all launches with tags "Report AND Performance" and may display the Launch 2. Accordingly, Widget B may filter all launches with tag "Report" and then display the list of launches with this tag, i.e. it may display all the reports available. Widget C may filter all launches with tags "Report AND Customer C" and then display only the report for the given customer. The main menu may display all launches with tag "Global' to expose all launches that may not be contextual.

Execution of a launch at a client computer of a web application internal or external to a host web application, responsive to a call for execution of the launch by a component of the host web application may comprise a number of actions. The component may be provided to be selectable at the host web application capable of calling for execution of the launch of the internal or external web application. A launch argument of the launch of the internal or external web application may then be obtained. The launch arguments may include a list of contextual launch keywords. The list of contextual launch keywords may be dynamically replaced, in the launch arguments of the called launch, by a list of corresponding values. The value used to replace a contextual launch keyword may be the value of the corresponding launch keyword as applicable when execution of the launch is called by the component of the host web application. Then the called launch may be executed using launch values defined by the list of values.

Obtaining a launch argument may comprise instructions to obtain a launch argument including a list of global launch keywords and a list of contextual launch keyword identifiers. The list of global launch keyword identifiers may be dynamically replaced in the launch arguments of a called launch by a list of corresponding values. The value used to replace a global launch keyword may be identified by a launch keyword module inquiring an extension directory.

Dynamically replacing the list or global launch keywords in the launch-definition may comprise the launch keyword module performing an inquiry to an extension directory in response to initialization of the host web application.

Figure 7:
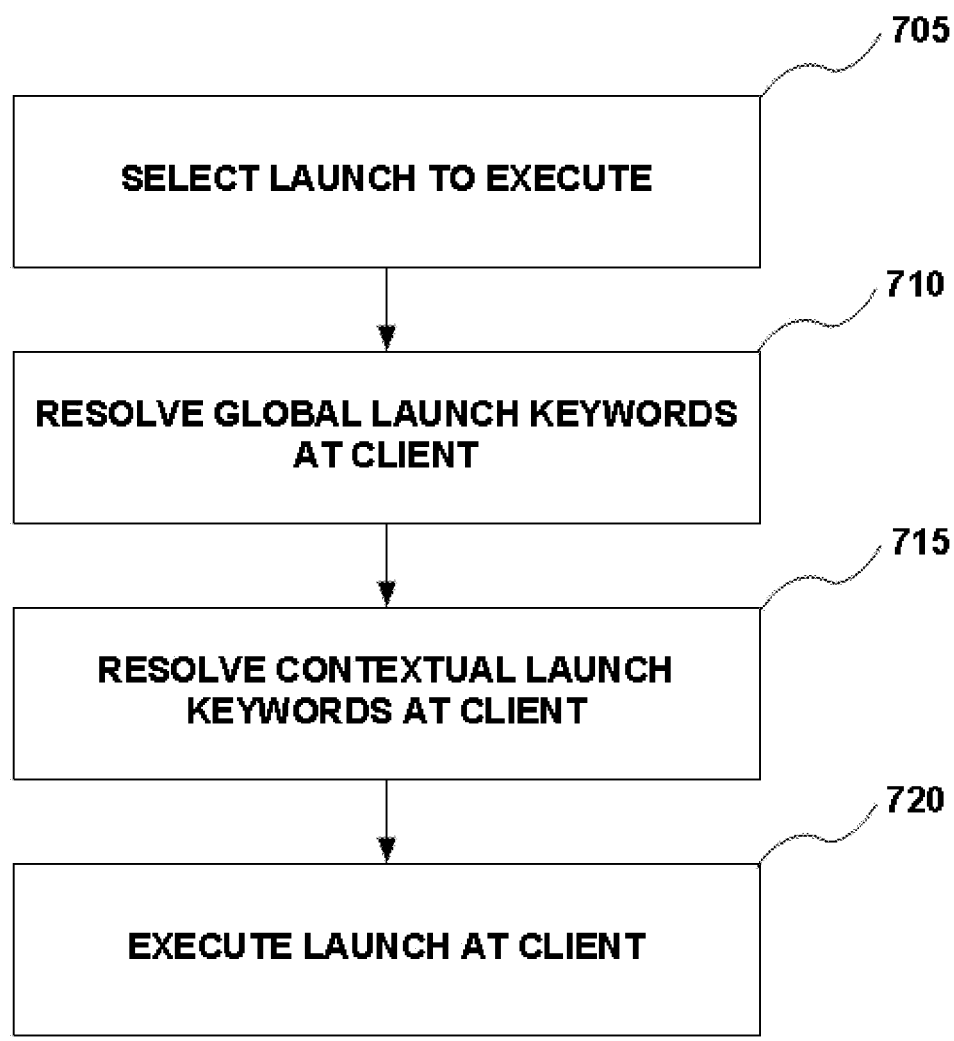
FIG. 7 is a flow diagram of a launch execution of a web application according to an example.

FIG. 7 is a flow diagram of a launch execution of a web application according to an example. In block 705, the launch to be executed may be selected. There are two types of launch keywords: global launch keywords and contextual launch keywords. When a launch is selected, the launch engine may try to solve all global launch keywords first, and then request to the widget to solve the contextual launch keywords. The global launch keywords do not need a context and they may be solved from anywhere in the web application. They usually are global definitions that may be changed by a platform administrator. Examples may include the host, port, protocol, title, etc. These global launch keywords may be stored in the client add-ons library and may be extended by, e.g. an add-ons JavaScript developer. Typically, launches using global launch keywords may be executed from anywhere and may be available in the main menu or in a specific widget listing all global launches (e.g. a widget that lists all external systems the operator can log on from the web application). As shown in FIG. 7, in block 710 the global launch keywords may be first resolved at the client. Then, in block 715, the contextual launch keywords may be resolved at the client. Contextual launch keywords are those keywords that the widget is the only component able to solve dynamically. Contextual launch keywords may be available from a widget and may expose selected data or results from queries. A widget developer may define the right contextual launch keyword available for the launch engine. For example, an add-on developer may have implemented the following launch keywords (group/keywords) ready to be used by URL in launch definitions:

| Keyword Name | Description |
| --- | --- |
| CUSTOMER_ID | May be replaced by the selected customer identifier during execution of the launch. A URL definition may use contextual information. |
| START_DATE | May be replaced by the selected start date of the widget during the execution of the launch. The widget may describe the format of the result. |
| DIMENSION | May be replaced by the selected dimension used to collect data in the widget during execution of the launch |

At the end, the entire launch may be considered prepared and ready for execution at the client, in block 720.

Figure 8:
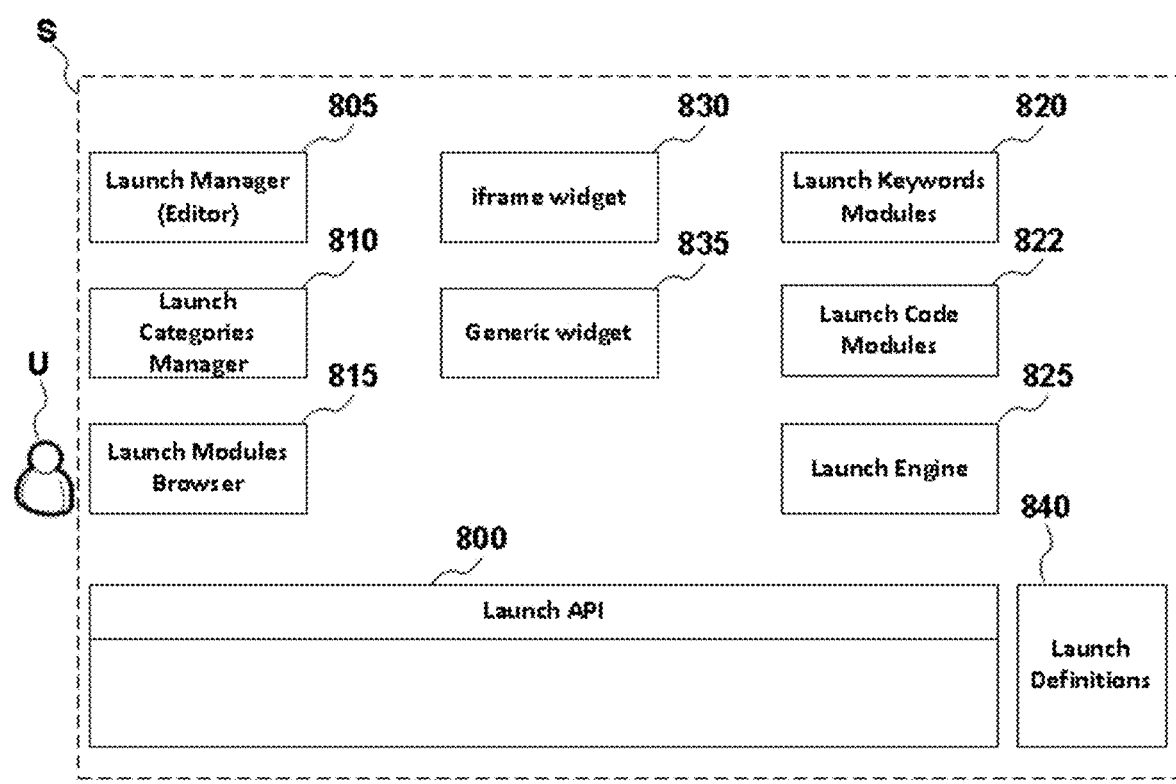
FIG. 8 is a diagram of components to support a web-application launch API according to an example.
Figure 9:
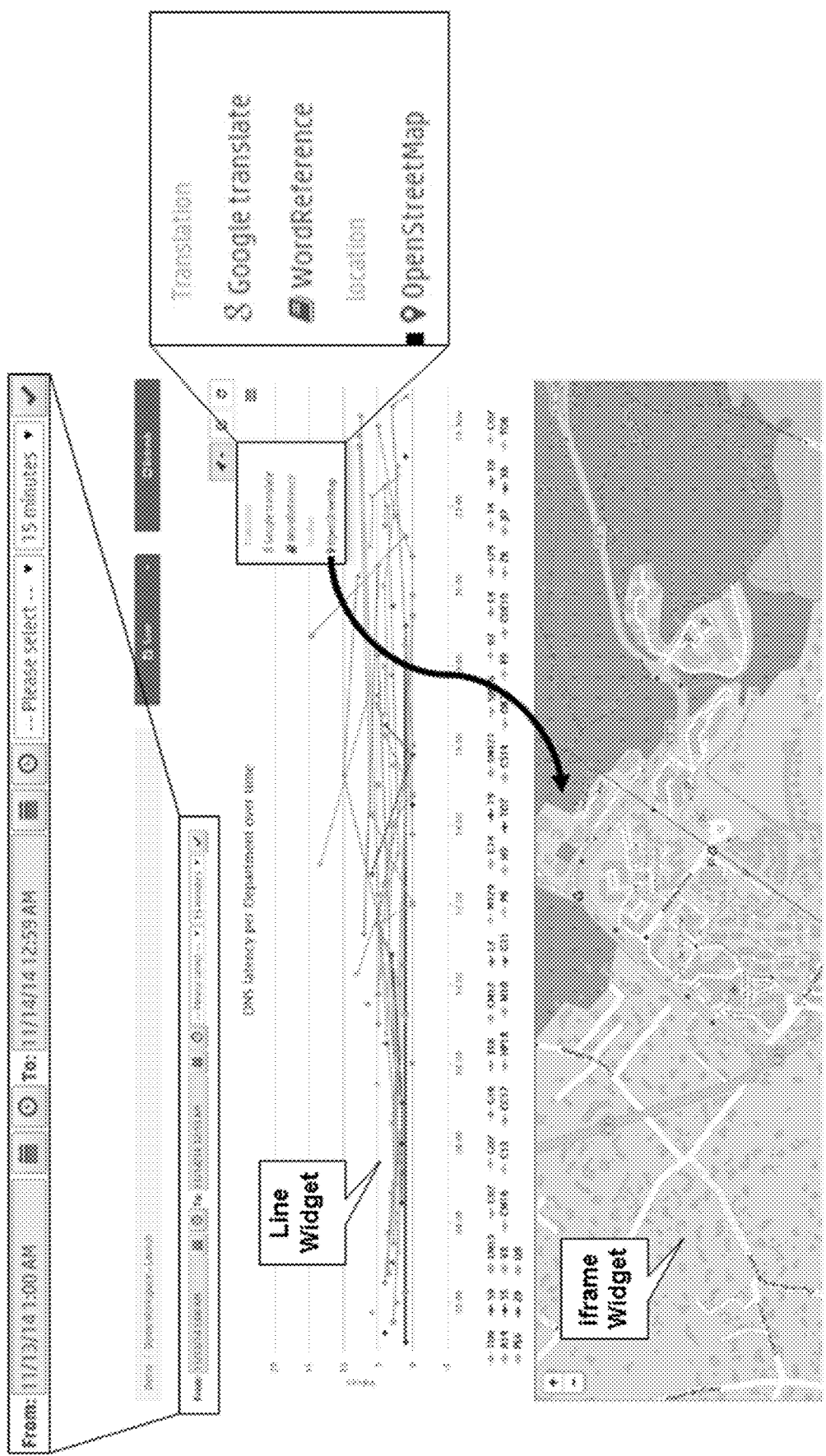
FIG. 9 is a screen shot illustrating use of a launch mechanism in a widget of a web application that integrates a web application launch API according to a particular example of the present disclosure.

FIG. 8 is a diagram of components to support a web-application launch API 800 according to an example. Launch manager (editor) 805 may be a GUI for editing launch definitions. Launch categories manager 810 may be a GUI for editing launch categories' definitions. Launch modules browser 815 may include launch keywords and code modules browsers to allow user U to browse any pieces of code that may have been implemented for the various launches. Launch keyword modules 820 may be client side modules for resolution of the global launch keywords. Launch Code Modules 822 may be client side modules for execution of the code modules. Accordingly, launch engine modules 825 may be client side modules for the implementation of the launches. There may be two types of widgets involved in the support of the launch API: iframe widgets 830 and generic widgets 835. Iframe widgets may be widgets embedded in a web page to display remote URLs in a seamless integration way instead of presenting the URL in a pop-up window. Generic widgets may extend the list of launch keywords they are able to solve and may depend on the context of the widget. The launch API may finally be supported by the launch definitions 840. An example of a launch mechanism shall be described below with ref. to FIG. 9. A web browser may act as a host web application and may comprise a GUI management module with menu list items, corresponding to the different launches that are available to the user and these may be displayed as part of the GUI. The host application may have a retrieval module which may obtain a list of the available launches, the list being provided by the web-application-launch API component. In the example of FIG. 9 the workspace of the web browser comprises a date and time range frame and a menu item in the form of a drop-down menu. The drop down menu comprises translation launches and location launches. The location launches comprise an OpenStreetMap launch that executes a launch applying contextual keywords from the date and time range frame. The user may select a date range and a time interval from the date and time range frame.

When the user interacts with the GUI to select a launch, the host application may communicate with the launch services web-application-launch API component to command execution of the identified launch. The API of the web-application-launch API component may specify a format for launch definitions and this format may include a launch argument. In the example of FIG. 9, the launch argument may include global keywords and contextual keywords, such as the Date Range and the Time Interval. When the web-application-launch API component receives a launch-execution command, i.e. when the user selects the OpenStreetMap from the drop-down menu, it shall resolve the launch keywords contained in the launch argument included in the definition of the desired launch, using a resolution process. The resolution process involves resolution of global launch keywords specified in the launch argument and the resolution of the contextual launch keywords. As a result, it may launch or update an iframe widget applying the contextual launch keywords in the updated iframe widget. The workspace of FIG. 9 further includes a Line Widget that may be updated when the date and time range field is updated. That is, the update of the Line Widget may be triggered by the event of changing the date range and/or time interval and may provide, as shown in the example, the DNS latencies of various departments over time during the selected date range and time interval. The iframe Widget is updated when the OpenStreetMap is selected from the drop-down menu.

A host web application that has integrated an example of the web application launch API component according to the present disclosure may be implemented in the form of a computer-readable medium including machine readable instructions that, when executed by a client computer, perform internally or externally execution of a launch of a web application external to the host web application.

Figure 10:
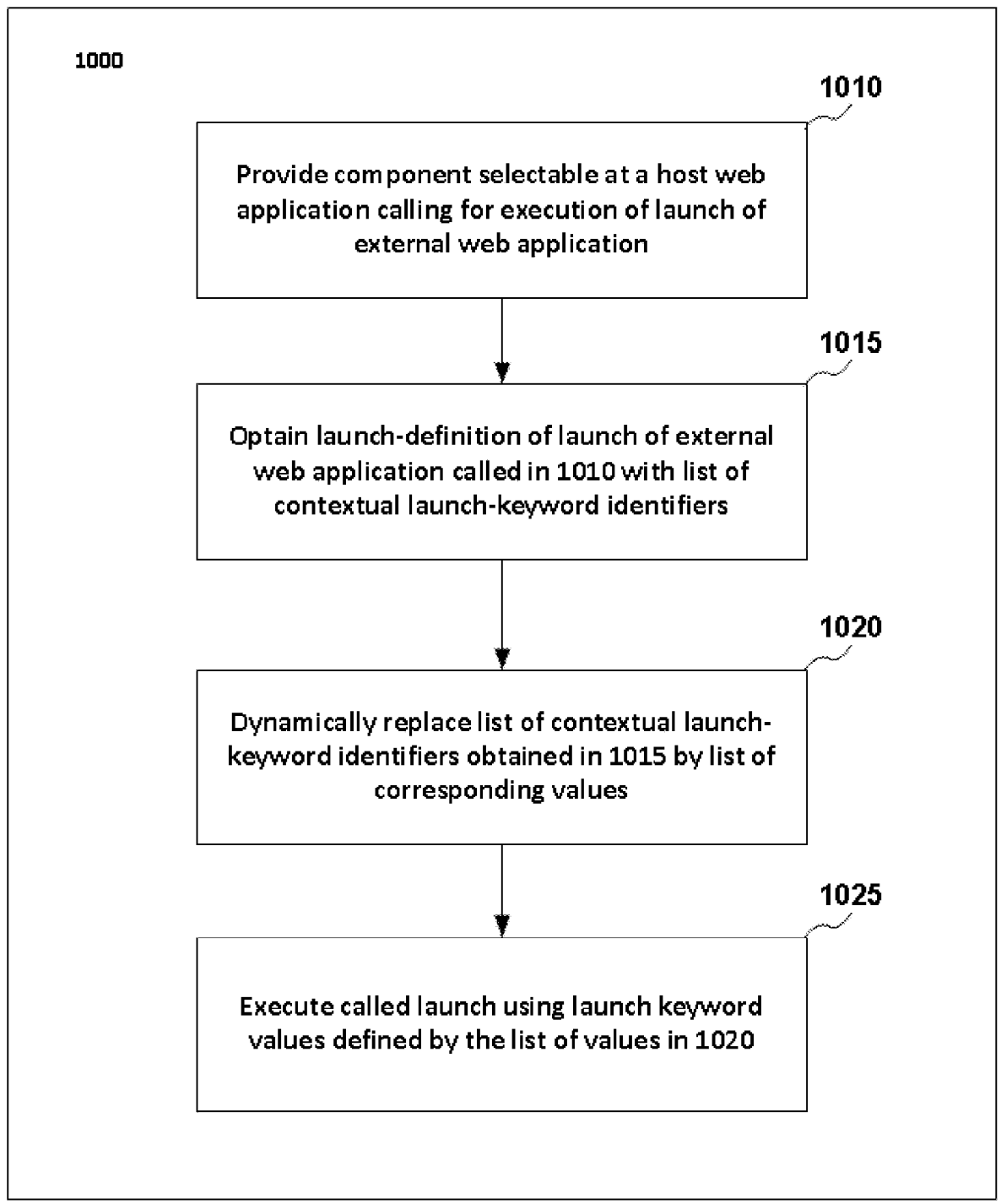
FIG. 10 illustrates an example of a computer-readable medium including machine readable instructions that, when executed by a client computer, perform internally or externally execution of a launch of a web application external to a host web application.

FIG. 10 illustrates an example of such a computer-readable medium 1000. As illustrated in FIG. 10, the computer readable medium includes:

instructions 1010 to provide the component selectable at the host web application capable of calling for execution of the launch of the external web application;

instructions 1015 to obtain a launch-definition of the launch of the external web application, the launch-definition including a list of contextual launch-keyword identifiers;

instructions 1020 to dynamically replace the list of contextual launch-keyword identifiers in the launch-definition of a called launch by a list of corresponding values, the value used to replace a contextual launch-keyword identifier being the value of the corresponding launch keyword as applicable when execution of the launch is called by the component of the host web application; and instructions 1025 to execute the called launch using launch keyword values defined by the list of values.

Various modifications and extensions can be made of the examples described above.

The invention claimed is:

1. A web-application-launch application programming interface (API) component for integration to a web application executable at a client, the web-application launch API component comprising:
   an API specifying a launch-definition format applicable to a launch of a web application external to the host web application, wherein a launch definition according to the specified launch-definition format includes a launch argument comprising a list of keywords that are dynamically placed in the launch definition at the client prior to executing the launch of the web application and further wherein the keywords are based on the context of running the web host application at the client; and
   a launch services module to manage execution of the launch at the client, the launch services module comprising:
   a keyword-resolution module, responsive to a call for execution of a launch, to resolve by the client the keywords of the launch argument in the launch definition of the called launch dynamically at runtime of the called launch, and an execution module to implement execution of the called launch, the execution being performed in accordance with the keywords in the launch argument of the called launch as resolved by the keyword-resolution module when execution of the launch is called.

2. The web-application-launch API component according to claim 1, wherein:
   the API specifies a launch-definition format wherein the launch argument of a launch definition comprises an additional list of global keywords, and the resolution module of the launch services module comprises a global keyword resolution module to inquire an extension directory to find a value of the global keywords in the launch.

3. The web-application-launch API component according to claim 2, wherein:
   the global-keyword resolution module is responsive to initialization of the host web application at the client to inquire the extension directory.

4. The web-application-launch API component according to claim 3, further comprising the extension directory.

5. The web-application-launch API component according to claim 2, wherein:
   the resolution module of the launch services module comprises a contextual-keyword resolution module to retrieve, from a component of the host application calling for execution of a launch, a value of the l keywords in the launch definition of the called launch.

6. The web-application-launch API component according to claim 1, wherein:
   the API specifies a launch-definition format wherein a launch definition comprises a list of tags, and
   the launch services module comprises a search module to identify an available launch by matching the list of tags in the launch definition of the launch to a list of tags received from a component of the host web application, and to inform the component sending the list of tags of the available launch.

7. The web-application launch API component according to claim 1, wherein the launch argument is a URL launch argument for launching an external or internal URL.

8. The web-application launch API component according to claim 1, wherein the launch argument is a code launch argument for launching an action external to the host web application.

9. The web-application launch API component according to claim 1, wherein the launch argument is a code launch argument for launching an action internal to the host web application.

10. A web-application-launch system comprising:
    a component, in a first web application executable at a client device;
    a launch-definition module to dynamically provide a launch-definition of a launch, of a second web application, available to be called for execution by the component at the client device, the launch-definition including a list of identifiers corresponding to a list of keywords that are dynamically placed in the launch-definition at the client device prior to executing the launch of the second web application, wherein the keywords are based on the context of running the first application at the client device; and
    a launch manager responsive to issuance, by the component, of a call for execution of a launch to perform dynamic assignment of values, at the client device, to the l keywords identified by the identifiers in the launch definition of the called launch.

11. The web-application-launch system according to claim 10, wherein:
    the launch definition module comprises a module to access a stored launch definition comprising an additional list of global keywords and the list of contextual keywords, wherein the global keywords and the contextual keywords corresponding to said identifiers of launch keywords, and the launch manager comprises a keyword-resolution module to dynamically resolve, at the client device, the contextual keywords at runtime of the called launch by assigning values to the contextual keywords in the launch-definition of the called launch, the value assigned to a contextual keyword being the value of the corresponding launch keyword as applicable when execution of the launch is called by the component of the first web application.

12. The web-application-launch system according to claim 10, further comprising a server, wherein the server comprises the stored launch definition with the additional list of global keywords and the list of contextual keywords and the component is to call a service at the server to access the list.

13. A non-transitory computer readable medium including machine readable instructions that when executed by a client computer perform internally or externally execution of a launch of a web application external to a host web application, responsive to a call for execution of the launch by a component of the host web application, the instructions comprising instructions to:

provide the component selectable at the host web application capable of calling for execution of the launch of the web application;

obtain a launch-definition of the launch of the web application, the launch-definition including a list of contextual launch-keyword identifiers;

dynamically, at the client computer, replace the list of contextual launch-keyword identifiers in the launch-definition of a called launch prior to executing a subsequent called launch by a list of corresponding values, the value used to replace the contextual launch-keyword identifier being the value of the corresponding launch keyword based on the context of running the host web application at the client device at the time of the subsequent launch and wherein the execution of the subsequent launch is called by the component of the host web application; and execute the called subsequent launch using the launch keyword values defined by the list of values.

14. The non-transitory computer readable medium according to claim 13, wherein:

the instructions to obtain a launch-definition comprise instructions to obtain a launch-definition including an additional list of global launch-keyword identifiers and the list of contextual launch-keyword identifiers, and there are further provided instructions to dynamically replace the list of global launch-keyword identifiers in the launch-definition of a called subsequent launch by a list of corresponding values, the value used to replace a global launch-keyword identifier being identified by inquiring an extension directory.

15. The non-transitory computer readable medium according to claim 13, wherein:

the instructions to dynamically replace the list of global launch-keyword identifiers in the launch-definition comprise instructions to perform an inquiry in the extension directory responsive to initialization of the host web application.

* * * * *